US008139607B2

(12) United States Patent
Sullivan et al.

(10) Patent No.: US 8,139,607 B2
(45) Date of Patent: Mar. 20, 2012

(54) SUBSCRIBER CONTROLLABLE BANDWIDTH ALLOCATION

(75) Inventors: Marc Sullivan, Austin, TX (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 881 days.

(21) Appl. No.: 12/017,257

(22) Filed: Jan. 21, 2008

(65) Prior Publication Data

US 2009/0187955 A1    Jul. 23, 2009

(51) Int. Cl.
*H04J 3/16* (2006.01)

(52) U.S. Cl. .............. 370/468; 370/230.1; 370/232; 370/235; 370/329; 370/431; 370/477; 709/224; 709/226; 725/95; 725/151

(58) Field of Classification Search .............. 370/468, 370/229, 230, 230.1, 232, 235, 252, 328, 370/329, 395.21, 395.41, 431, 477; 709/224, 709/226, 232, 233; 725/106, 86, 87, 93, 725/95, 151
See application file for complete search history.

(56) References Cited

U.S. PATENT DOCUMENTS

| | | | |
|---|---|---|---|
| 2002/0071486 A1 | 6/2002 | Van Der Schaar et al. | |
| 2003/0016630 A1 | 1/2003 | Vega-Garcia et al. | |
| 2004/0022322 A1 | 2/2004 | Dye | |
| 2004/0055020 A1* | 3/2004 | Delpuch | 725/134 |
| 2004/0153951 A1 | 8/2004 | Walker et al. | |
| 2004/0184533 A1 | 9/2004 | Wang | |
| 2004/0184534 A1 | 9/2004 | Wang | |
| 2004/0184535 A1 | 9/2004 | Wang | |
| 2004/0240390 A1 | 12/2004 | Seckin | |
| 2005/0169546 A1* | 8/2005 | Shin et al. | 382/239 |
| 2005/0220188 A1 | 10/2005 | Wang | |
| 2005/0229228 A1* | 10/2005 | Relan et al. | 725/116 |
| 2005/0286873 A1* | 12/2005 | Kamogawa et al. | 386/111 |
| 2007/0086485 A1* | 4/2007 | Vega-Garcia et al. | 370/468 |
| 2007/0107023 A1* | 5/2007 | Versteeg et al. | 725/95 |
| 2009/0103488 A1* | 4/2009 | Zhu et al. | 370/330 |

* cited by examiner

*Primary Examiner* — Luat Phung
(74) *Attorney, Agent, or Firm* — Jackson Walker L.L.P.

(57) ABSTRACT

A computer program product includes computer executable instructions, stored on a computer readable medium, for allocating bandwidth among various network provided communication services. The executable instructions include instructions to process a subscriber request to specify a bandwidth allocation, determine a multimedia bandwidth allocation indicative of bandwidth allocated to multimedia content, and generate a multimedia content request. The multimedia content request is influenced by the multimedia bandwidth allocation. In some embodiments, for example, the multimedia content request includes multimedia bandwidth information determined at least in part by the multimedia bandwidth allocation. The multimedia bandwidth information may indicate the bandwidth available for multimedia content, which may be determined from the multimedia bandwidth allocation less any bandwidth allocated to or otherwise consumed by other multimedia layers. In these embodiments, a multimedia delivery server may determine how much bandwidth to allocate to the requested multimedia content from information contained in the request itself.

24 Claims, 6 Drawing Sheets

SUBSCRIBER CONTROLLABLE BANDWIDTH ALLOCATION

BACKGROUND

1. Field of the Disclosure

The present disclosure relates to the delivery of networked services by a service provider and, more particularly, to bandwidth constraints associated with the delivery of networked services.

2. Description of the Related Art

Service providers may provide their subscribers with various services including multimedia services by which subscribers obtain television and other multimedia content for viewing, data services such as Internet access, and telephony services including local, long distance, and/or video conferencing telephone services. In a bundled scenario, a provider may deliver two or more of these services to subscribers over an access network physical layer that is common to the bundled services. Each service in the bundle consumes a portion of the maximum data rate or bandwidth that the physical layer can sustain. The finite bandwidth must be distributed among the bundled services so that an increase in the bandwidth allocation for one service must be offset by a decrease in bandwidth allocation for one or more of the other services. There is, however, no allocation of bandwidth among multimedia, telephony, and data that is universally optimal for all subscribers.

DESCRIPTION OF THE EMBODIMENT(S)

Figure 1:
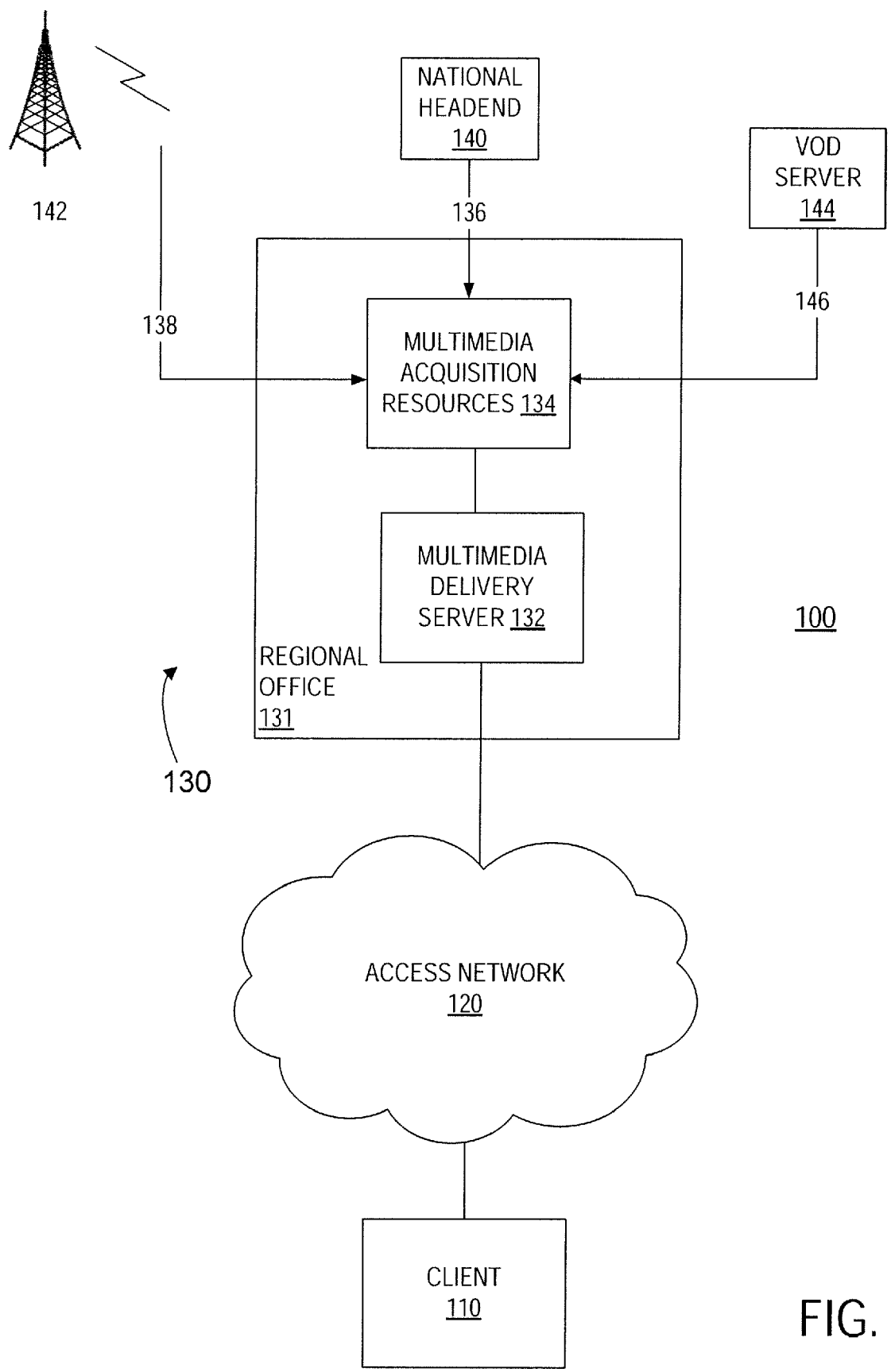
FIG. 1 is a block diagram of selected elements of an embodiment of a network suitable for providing networked communication services and emphasizing multimedia content delivery services.

The disclosed subject matter describes the provisioning of subscriber controllable bandwidth allocation that enables the subscriber to control, for example, video quality. A subscriber is enabled to allocate available bandwidth to various services including multimedia content delivery services and thereby adjust the video quality of a multimedia content stream in order to optimize bandwidth usage in a constrained bandwidth environment that supports multiple applications. Multimedia content may be processed into multiple layers of content where each layer may contain a portion of the spatial, temporal, chromatic, and/or luminance information contained in an original multimedia content layer. The original multimedia content layer is processed into a set of one or more reduced-bandwidth layers including, in some implementations, a baseline layer and a set of one or more supplemental layers that add multimedia information to the baseline layer and thereby supplement the quality of the resulting layer.

The disclosed subject matter enables subscribers to adjust multimedia quality as needed and thereby conserve bandwidth. Bandwidth that is not allocated to multimedia content remains available for other services including telephony and data services. When the highest quality of a particular program or other item of multimedia content is not required, bandwidth may be diverted from multimedia services to other services including, as examples, Internet and voice services as well as to other multiprograms.

Some embodiments may leverage layered encoding techniques to process multimedia content into various combinable reduced bandwidth layers that carry less information than the original content. The "layering" of multimedia content may include spatially based layering, temporally based layering, other suitable layering techniques, or a combination thereof. By making layered multimedia content available, the network enables subscribers to customize their bandwidth allocation based in part on the level of multimedia quality desired.

In a temporally layered implementation, for example, original multimedia content may have a frame rate of "L" frames/second, e.g., L=60. The original content may be processed into a baseline layer and at least one supplemental layer. The baseline layer may represent information corresponding to "N" of the original "L" frames per second where "N" is less than "L", e.g., N=15, 30, or another value. Each supplemental layer may represent an additional "M" of the "L" frames per second where "M" is less than "N", e.g., N=10, 15, or another value.

In some embodiments, the original content is encoded just once and the encoded content is then processed into multiple reduced bandwidth layers. Depending upon factors including the layering technique(s) employed, other embodiments may layer the original content first and then separately encode each of the layers. In some embodiments, each layer contributes a portion of the spatial, temporal, chromatic, and/or luminance information to the multimedia stream that is ultimately provided to the subscriber's display device.

When a subscriber increases the bandwidth allocated to multimedia content generally or to a particular multimedia content layer, one or more additional supplemental multimedia layers may be delivered to the subscriber's set top box or other suitable device. In this manner, the disclosed subject matter enables subscribers to allocate bandwidth to multimedia layers as needed. In constrained bandwidth situations, this functionality allows the subscriber to conserve bandwidth that might then be available for other network provided services including data and telephony services.

In one aspect, a disclosed computer program product includes computer executable instructions, stored on a computer readable medium, for allocating bandwidth among various network provided communication services. The executable instructions include instructions to process a subscriber request to specify a bandwidth allocation, determine a multimedia bandwidth allocation indicative of bandwidth allocated to multimedia content, and generate a multimedia content request. The multimedia content request is influenced by the multimedia bandwidth allocation. In some embodiments, for example, the multimedia content request includes multimedia bandwidth information determined at least in part by the multimedia bandwidth allocation. The multimedia bandwidth information may indicate the bandwidth available for multimedia content, which may be determined from the multimedia bandwidth allocation less any bandwidth allocated to or otherwise consumed by other multimedia layers. In these embodiments, a multimedia delivery server may determine how much bandwidth to allocate to the requested multimedia content from information contained in the request itself.

In other embodiments, the multimedia content request may explicitly specify a set of one or more reduced bandwidth layers. In these embodiments, generating the multimedia content request includes selecting multimedia content layers from a set of available multimedia content layers. The available content layers include a baseline layer and a set of supplemental layers. The baseline layer and the supplemental layers may each contain respective layers of content corresponding to the requested multimedia content.

A set top box or other device may further include instructions to combine the selected layers into a combined layer suitable for delivery to a display device. The instructions may further include instructions to verify a requested allocation against available bandwidth constraints.

In another aspect, a disclosed multimedia server is operable to provide multimedia content to a subscriber. The server accesses an original stream of multimedia content that corresponds to a program or other item of multimedia content. The server generates a set of reduced bandwidth layers from the original stream. Upon receiving a subscriber request for the multimedia content title, the server may select all or a subset of the reduced bandwidth layers and deliver the selected layers to the subscriber. The reduced bandwidth layers may include a baseline layer and a set of supplemental layers. The original stream may represent L frames/second of the multimedia content and the baseline layer may represent N frames/second of the multimedia content wherein L is greater than N. For example, L equals sixty and N is less than or equal to thirty in some embodiments and N is equal to fifteen in other embodiments. At least some of the supplemental layers may include information for M frames/second of the multimedia content wherein M is less than or equal to N. The frames represented by a supplemental layer may be different than the frames represented by the baseline layer and by the other supplemental layers. In some implementations, the multimedia server selects the layers to deliver to the subscriber based at least in part on multimedia bandwidth information contained in the subscriber request itself. This selection may include selecting a maximum number of the baseline layer and set of supplemental layers compatible with the bandwidth information. In other embodiments, the subscriber request indicates which of the reduced bandwidth layers to select. The original stream may include original spatial, temporal, chromatic, and luminance information and the baseline layer and the supplemental layers may include a portion of the original spatial, temporal, chromatic, and/or luminance information. Generating the set of reduced bandwidth layers may include encoding a baseline layer and at least one enhanced layer.

In still another aspect, a disclosed service for enabling a subscriber to allocate available bandwidth to different services includes enabling a set top box to process a bandwidth allocation indication from the subscriber, enabling the set top box to process a subscriber indication of an item of multimedia content, enabling the set top box to receive a plurality of multimedia layers corresponding to the indicated item of multimedia content, and enabling the set top box to combine the plurality of multimedia layers into a combined layer suitable for delivery to a display device. A bandwidth of the combined layer may be influenced at least in part by a multimedia bandwidth allocation contained in the bandwidth allocation indication. The bandwidth allocation indication may include, in addition to the multimedia bandwidth allocation indication, a telephony bandwidth allocation indication and a data bandwidth allocation indication. The plurality of multimedia layers may include a baseline layer and a set of at least one supplemental layer. The baseline layer may correspond to a baseline layer of the multimedia content item and each of the supplemental layers may correspond to a corresponding additional layer of the multimedia content item. Each layer of the multimedia content may include a portion of spatial, temporal, chromatic, and/or luminance information contained in an original layer of the multimedia content item. In some embodiments, the baseline layer may represent thirty or fewer frames/second of the multimedia content item and each of the supplemental layers may represent less fifteen or fewer frames/second. The bandwidth allocation information may include a multimedia bandwidth indication and the service may include enabling the subscriber to further allocate the multimedia bandwidth indication among a set of multiple streams. The set of layers may include, for example, one or more layers for a standard definition stream and one or layers for a high definition stream.

In still another aspect, a disclosed service for enabling a subscriber to allocate available bandwidth among a plurality of services includes enabling the subscriber to indicate a multimedia bandwidth allocation. The multimedia bandwidth allocation limits or otherwise affects a telephony bandwidth allocation, a data bandwidth allocation, or both. The service includes enabling the subscriber to request an item of multimedia content. A video quality of the requested item depends at least in part on the indicated multimedia bandwidth allocation.

In the following description, details are set forth by way of example to facilitate discussion of the disclosed subject matter. It should be apparent to a person of ordinary skill in the field, however, that the disclosed embodiments are exemplary and not exhaustive of all possible embodiments. Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram of selected elements of a multimedia content distribution network 100, sometimes referred to herein simply as multimedia network 100. In the depicted embodiment, multimedia network 100 includes a client 110 connected to a multimedia service provider 130 by an intervening access network 120.

Figure 3:
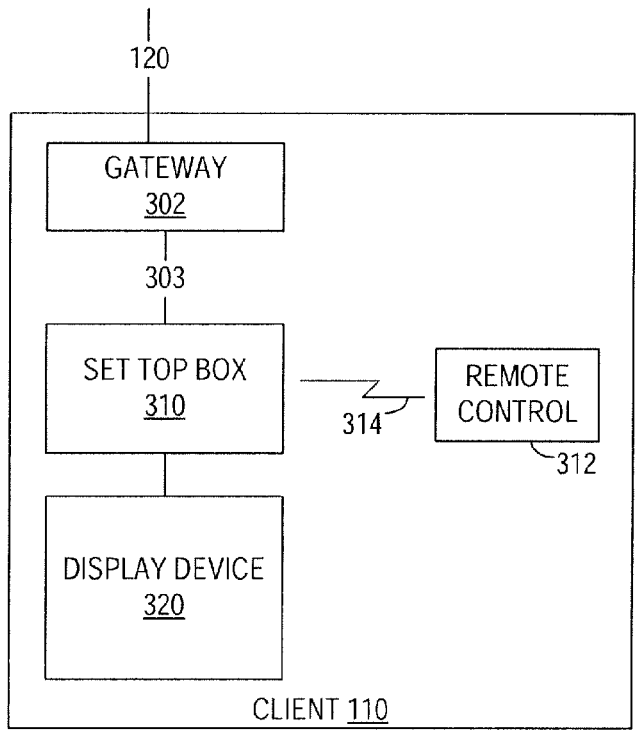
FIG. 3 is block diagram of selected elements of an embodiment of the client of FIG. 1.

In some embodiments, client 110 represents devices and/or applications used by a subscriber to multimedia services and/or a user or viewer of multimedia content. Referring to FIG. 3, a block diagram illustrates selected elements of an embodiment of client 110. In the depicted embodiment, client 110 includes a residential gateway (RG) 302, a set top box (STB) 310, and a display device 320. RG 302 may provide a firewall and/or routing functionality between a local area network (LAN) 303 to which STB 310 is connected and the access network 120. STB 310 is a special purpose data processing unit that includes, in addition to an embedded or general purpose microprocessor and storage, video processing elements including an audio/visual decoder. Display device 320 encompasses any monitor suitable for receiving audio/video content from STB 310. In embodiments of client 110 that employ an Internet protocol (IP) based access network, RG 302 receives multimedia content as a series of datagrams or packets. The packets are assembled and otherwise processed within STB 310 and converted to analog signals suitable for presentation to display device 320.

Figure 4:
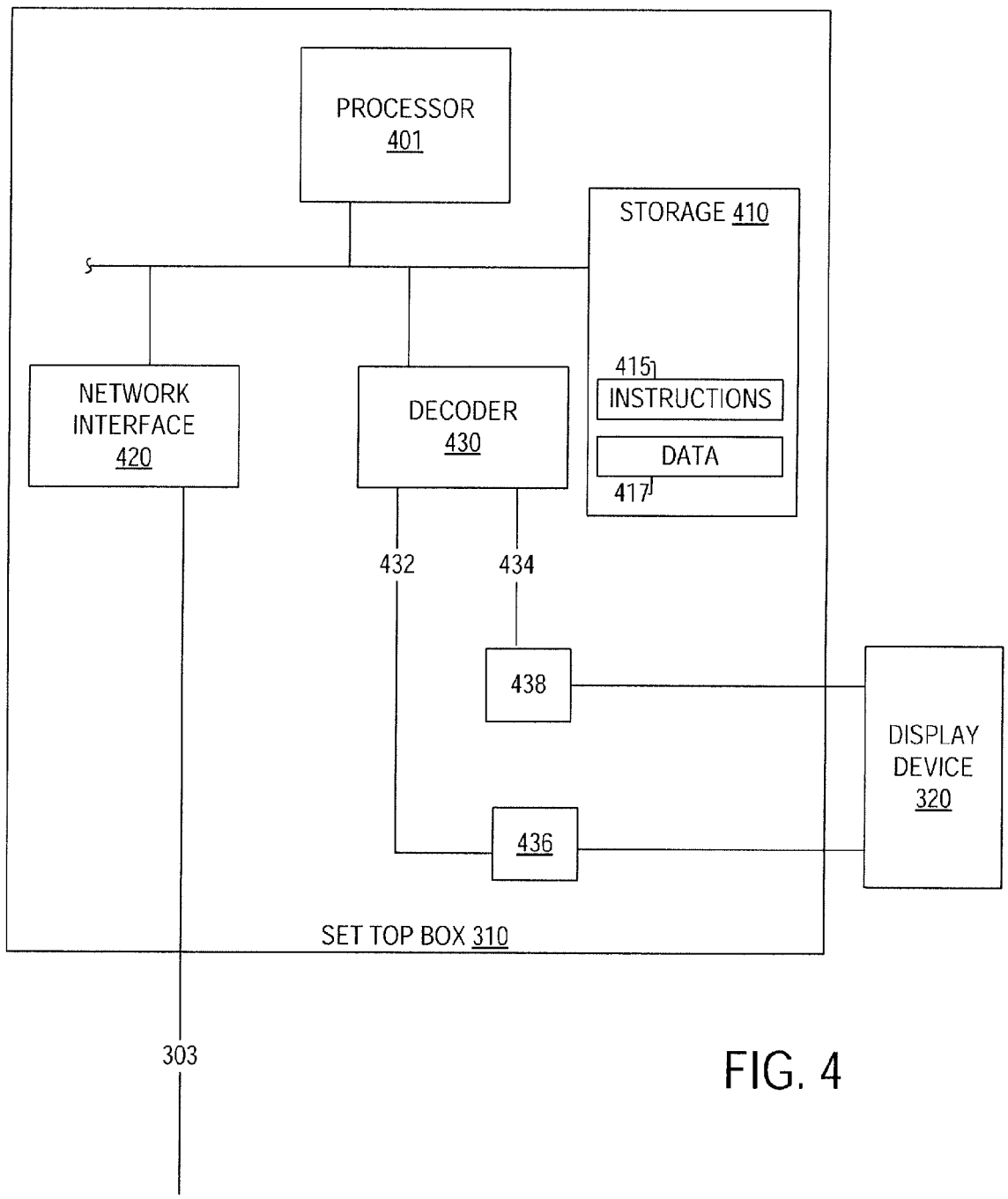
FIG. 4 is a block diagram of selected elements of an embodiment of the set top box of FIG. 3.

An embodiment of STB 310 is illustrated in FIG. 4. In this implementation, STB 310 includes a processor 401 and general purpose storage 410 connected to a shared bus. A network interface 420 enables STB 310 to communicate with LAN 303. A integrated audio/video decoder 430 generates native format audio 432 and video signals 434. Signals 432 and 434 are encoded and converted to analog signals by digital-to-analog (DAC)/encoders 436 and 438. The output of DAC/encoders 436 and 438 is suitable for delivering to a National Television System Committee (NTSC), Phase Alternating Line (PAL), or other type of display screen.

Returning now to FIG. 1, some embodiments of multimedia service provider 130 encompass equipment and/or services used by an entity that provides multimedia services to one or more subscribers. As used in this disclosure, the terms "multimedia" and "multimedia content" encompass motion video content, whether live or pre-recorded, including conventional television programming content, video-on-demand content, pay-per-view content, and so forth. The depicted embodiment of multimedia service provider 130 employs a hierarchical structure in which a regional office receives multimedia content from a national headend and supplements the nationally provided content with regional broadcast content. The regional offices 131, in turn, distribute content to subscribers over access network 120.

As depicted in FIG. 1, multimedia service provider 130 includes regional offices 131, only one of which is depicted. The depicted embodiment of regional office 131 includes multimedia acquisition resources 134 and a multimedia delivery server 132. Multimedia acquisition resources 134 encompass receivers, signal processors, and servers operable to receive multimedia content from one or more providers. As depicted in FIG. 1, for example, multimedia acquisition resources 134 receive national feed content 136 from a national headend 140 via a fiber optic or other form of high bandwidth backbone. National feed content 136 may include nationally distributed programming such as CNN, TNT, ESPN, and the like. Multimedia acquisition resources 134 as shown also receive regional content 138 from one or more regional broadcasters 142, one of which is represented by a conventional broadcast transmission tower. Regional content 138 may include over-the-air broadcast content from legacy broadcasters including NBC, ABC, CBS, FOX, and PBS. Multimedia acquisition resources 134 may further receive video-on-demand (VOD) content 146 from a locally or remotely located VOD server 144. In addition to the content received from each of these sources, regional office 131 may inject local advertising, public service announcements, and other additional content into multimedia delivery server 132.

Multimedia delivery server 132 encompasses resources that process content requests from clients 110 to provide and route requested content to the requesting client(s). In IP based implementations of access network 120, multimedia delivery server 132 may employ multicasting to deliver "live" content to multiple subscribers. Multicasting conserves bandwidth by transmitting just a single layer to multiple subscribers who have requested the same multimedia content title. The multimedia delivery server 132 may also employ unicasting to deliver VOD and other "time shifted" content and/or pay-per-view (PPV) content and other content that requires special payment provisions. Multimedia delivery server 132 may also encompass resources to authenticate requests to ensure that content is provided only to authorized subscribers according to any applicable terms of service.

Multimedia delivery server 132 may include resources to encode and/or format multimedia content so that the resulting content is suitable for transmission over access network 120. For example, multimedia delivery server 132 may employ a pervasive or proprietary coder/decoder (codec) to compress and/or encrypt content prior to transmission. Compression is widely used for multimedia content transmission and storage to reduce the amount of data that must be transmitted over the network or stored in memory, disk, or another storage resource.

Data compression is an effective technique for representing video content for two related reasons. First, uncompressed video of any substantial quality and duration generally consumes large amounts of data. Second, uncompressed video generally contains extensive amounts of redundant data. Compression is effective when at least some of the redundant information can be removed during encoding without removing substantial amounts of the non-redundant information.

The redundancy that is characteristic of many of the most popular forms of video content includes spatial redundancy, which refers to redundancy within a single frame or picture of a video layer, and temporal redundancy, which refers to redundancy that occurs in successive frames. Video compression algorithms may attempt to achieve spatial compression, temporal compression, and/or other types of compression appropriate for multimedia content. The compression scheme used in any particular implementation of multimedia delivery server 132 is an implementation detail, but the scheme may comply with various open or otherwise pervasive video encoding standards including, for example, any of the Motion Picture Experts Group (MPEG) family of video encoding standards and any Windows Media Video (WMV) video encoding standard from Microsoft.

Figure 2:
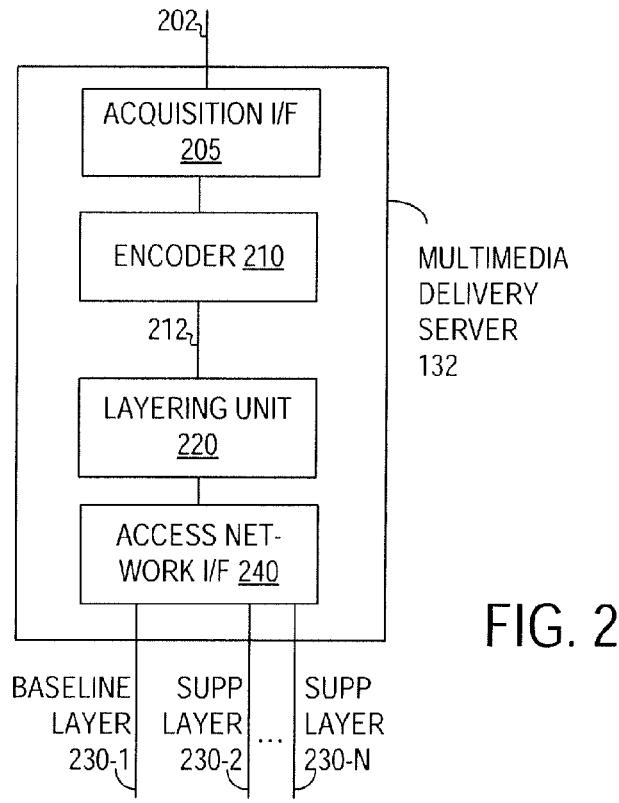
FIG. 2 is a block diagram of selected elements of an embodiment of a multimedia delivery server suitable for use in the network of FIG. 1.

Referring to FIG. 2, a block diagram of selected elements of an embodiment of multimedia delivery server 132 suitable for use in a layered video application as described herein is presented. In the depicted embodiment, multimedia delivery server 132 includes an acquisition interface 205 connected to and operable to communicate with an encoder 210. Acquisition interface 205 may receive a native or unencoded layer 202 of video content from multimedia acquisition resources 134 (see FIG. 1).

Acquisition interface 205 may buffer or otherwise store content that it receives until accessed by encoder 210. Encoder 210 is operable to encode or otherwise process unencoded video layer 202 to produce an encoded video layer 212 of video content. The processing executed by encoder 210 may include one or more types of video compression including spatial compression, temporal compression, and/or signal-to-noise (SNR) compression. Encoder 210 may perform other types of encoding including, for example, encryption.

Layering unit 220 as depicted in FIG. 2 receives encoded video layer 212 and generates a set of reduced bandwidth layers 230 including a baseline layer 230-1 and a set of one or more supplemental layers 230-2 through 230-N. The reduced bandwidth layers 230 are reduced bandwidth layers in the sense that the bandwidth required of or consumed by any one of the reduced bandwidth layers 230 is less than the bandwidth required of or consumed by encoded video layer 212. The manner in which layering unit 220 generates reduced bandwidth reduced bandwidth layers 230 may vary among different embodiments.

Techniques employed by layering unit 220 to generate reduced bandwidth reduced bandwidth layers 230 may include temporal layering, spatial layering, SNR layering, any other suitable layering technique, or a combination thereof. Temporal layering encompasses techniques in which each reduced bandwidth layer corresponds to a different set of time slices or frames. If, for example, a frame rate of encoded video layer 212 is 60 frames/second, baseline layer 230-1 may represent 15 frames/second and each of three supplemental layers 230-2, 230-3 (not depicted), and 230-4 (not depicted) may represent their own respective 15 frames/second. When the reduced bandwidth layers 230 are later aggregated or otherwise combined, the video content presented to the subscriber has a frame rate of 15, 30, 45, or 60 frames/second depending upon how many supplemental layers are being utilized.

Temporal layering has an advantage in that the frames in the reduced bandwidth layers correspond to frames in the encoded video layer 212. However, temporal layering does introduce complexities in terms of handling temporal compression. Many temporal compression algorithms rely on inter-frame references. MPEG, for example, supports the concept of frame "types" that include referential or predictive frame types whose contents are influenced by the contents of previous frames, subsequent frames, or both. If the frames referenced by a predictive frame in the encoded video layer are excluded through temporal layering, it might be necessary for client 110 to include functionality for re-processing at least some aspects of the temporal compression.

In some embodiments, layering unit 220 may employ spatial layering. Spatial layering refers generally to generating layers that represent different levels of spatial resolution. For example, spatial layering may produce a baseline layer 230-1 and a supplemental layer 230-2 where the baseline layer 230-1 represents the "even" pixels of the display screen and supplemental layer 230-2 represents the "odd" pixels. Spatially layered content is highly useful in heterogeneous environments in which display screens have varying maximum resolution capabilities. Other embodiments of layering unit 220 may employ alternative layering techniques including, for example, SNR layering, in which each additional supplemental layer reflects a different level of compression quantization. Moreover, some embodiments may employ combinations of these techniques. Each of the layering techniques employed may introduce encoding and/or decoding complexities and display device 320, as described below may include functionality to decode and/or uncompress layered content that includes temporal, spatial, SNR, and/or other types of layering.

Multimedia delivery server 132 as depicted in FIG. 2 further includes an access network interface 240. Access network interface 240 as depicted receives the reduced bandwidth layers 230 generated by layering unit 220. Access network interface 240 connects to access network 120 and receives subscriber requests via access network 120. In some embodiments, access network interface 240 is responsible for authenticating or otherwise verifying subscriber requests for multimedia content and for transmitting or otherwise delivering requested content to the appropriate subscribers.

Access network interface 240 as implemented in the depicted embodiment of multimedia delivery server 132 may include resources to maintain multicast groups representing a set of subscribers who are viewing the same content and to moderate the members of multicast groups to reflect subscriber channel changes and other events. Embodiments of access network interface 240 suitable for use with IP-based access networks are operable to process an encoded video content layer into a set of datagrams or packets and unicast or multicast the resulting set of packets to one or more subscribers via access network 120. Moreover, to support user defined bandwidth allocation as described herein, access network interface 240 is operable to maintain multicast groups based, not only on the content being viewed by subscribers, but also on the amount of total bandwidth the subscriber has allocated to multimedia. Thus, for example, access network interface 240 may maintain a plurality of multicast groups for a particular television show including a first multicast group corresponding to subscribers who have a first level of allocated multimedia bandwidth, a second multicast group corresponding to subscribers who have a second level of allocated multimedia bandwidth, and so forth.

Access network 120 includes a physical layer interconnection between one or more clients such as the client 110 depicted in FIG. 1 and multimedia service provider 130. In some embodiments, access network 120 is an IP compliant network. Access network 120 may be a public network or a provide network that is owned, managed, or otherwise operated by multimedia service provider 130. The physical layer implementation of access network 120 may include twisted pair copper cables, coaxial cables, high speed fiber optic cables, and so forth.

In embodiments that employed IP-based access networks 120, multimedia content may be delivered from service provider 130 to client(s) 110 as a series or sequence of datagrams or packets. The datagrams or packets may correspond to a particular "channel" such that the packets are based on a single multimedia content title or item. In these embodiments, client(s) 110 may receive packet layers that correspond to one or just a few multimedia content title. In other words, the content that is actually provided to client(s) 110 may be limited to one or so multimedia content layers. In other embodiment that use higher bandwidth physical layer interconnections including, as an example, coaxial cable based embodiments, the multimedia service provider 130 may deliver all or substantially of its available multimedia content titles over the physical layer interconnection. In these embodiments, a client 110 may include a tuner or filter that parses the desired content from the remainder of the content.

Figure 5:
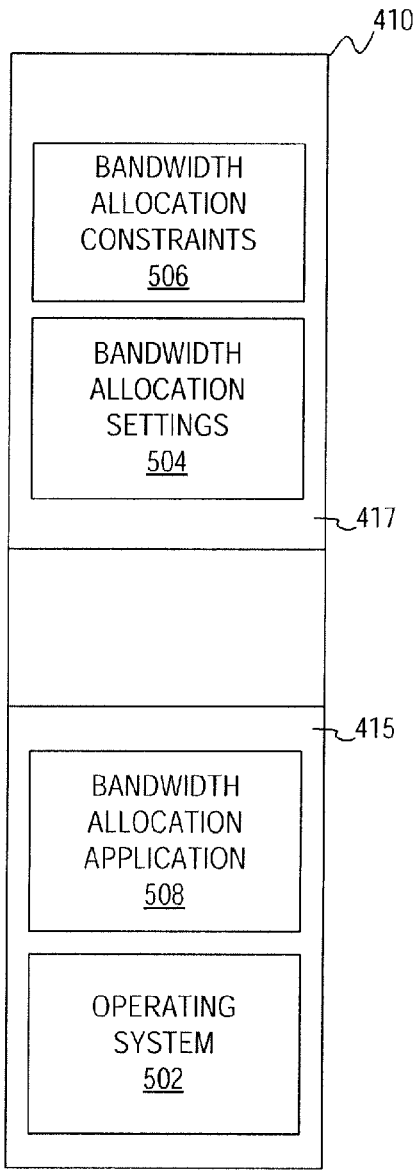
FIG. 5 is a block diagram of selected elements of an embodiment of a storage resource of the set top box of FIG. 4.

Referring now to FIG. 5, a block diagram illustrates selected elements of an embodiment of the instructions 415 and the data 417 of the storage resource 410 shown in FIG. 4. In embodiment depicted in FIG. 5, the instructions 415 include an operating system 502 and a bandwidth allocation application 508 and the data 417 includes a data structure identified as bandwidth allocation settings 504 and a data structure referred to as bandwidth allocation constraints 506. Operating system 502 works in conjunction with STB processor 401 to manage storage and processing resources including multimedia processing resources and to provide an environment in which application programs including bandwidth allocation application 508 can execute. Bandwidth allocation application 508 is described in greater detail below, but may include functionality to enable a subscriber to modify bandwidth allocation settings 504, to receive a subscriber request for content indicating a specific program or other item of multimedia content, and to generate and send an STB request for a program to multimedia service provider 130 (FIG. 1) where the STB request for content indicates the requested program or other item of multimedia content and includes information, referred to herein as allocation influenced information, that pertains to the multimedia bandwidth allocation settings, the number of reduced bandwidth layers to retrieve, or both.

In the embodiment depicted in FIG. 5, exemplary data structures in data 417 of STB storage resource 410 include bandwidth allocation settings 504 and bandwidth allocation constraints 506. Bandwidth allocation settings 504 may store a set of bandwidth allocation values including a multimedia bandwidth allocation value, a telephony bandwidth allocation value, and a data bandwidth allocation value. In addition, some embodiments may further refine the bandwidth allocations for some or all of the services. Bandwidth allocation settings 504 may include, for example, values for allocating the multimedia bandwidth allocation among a set of programs or other items of multimedia content that are being viewed and/or stored to storage resource 410.

In some embodiments, bandwidth allocation constraints 506 is a data structure that includes values against which the values in bandwidth allocation settings 504 may be compared. If the bandwidth allocation values result in a conflict with the bandwidth allocation constraints 506, STB 310 will respond with corrective action including, as examples, generating a subscriber viewable message and/or automatically adjusting the bandwidth allocation setting values to comply with the bandwidth allocation constraint values. Bandwidth allocation constraints 506 may include self-imposed constraints as well as constraints that represent fundamental physical or other types of limitations. Bandwidth allocation constraints 506 may, for example, include minimum bandwidth constraints that represent a lower limit on the ability to process the applicable service. Bandwidth allocation constraints 506 may also include maximum bandwidth constraints that represent limits on how much bandwidth is consumed by a service. STB 310 may invoke bandwidth throttles to limit bandwidth consumption by the service(s) applicable to the constraint.

Figure 6:
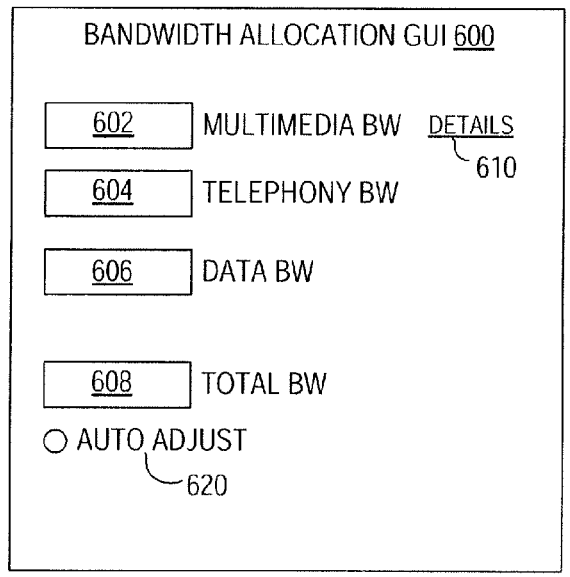
FIG. 6 illustrates selected elements of an exemplary bandwidth allocation graphical user interface.

Bandwidth allocation application 508 may be operable to present subscribers with one or more user interfaces to support and/or facilitate subscriber indicated bandwidth allocation values. Referring to FIG. 6, selected portions of an exemplary bandwidth allocation graphical user interface (GUI) 600 is shown. In the depicted embodiment, bandwidth allocation GUI 600 includes objects 602 through 608 for entry of requested bandwidth allocation values. Object 602 is an entry box for entering a request or indication of a multimedia bandwidth allocation, object 604 is an entry box for entering a telephony bandwidth allocation, and object 606 is an entry box for entering a request or indication of a data bandwidth allocation. Object 608 as shown is a data box that may display the sum of the bandwidth allocation values in entry boxes 602, 604, and 606.

Bandwidth allocation GUI 600 may further include an auto adjust button 620. When auto adjust button 620 is active, the button on bandwidth allocation GUI 600 will be shaded to indicate that bandwidth allocation application 508 is in an auto adjust mode of operation and may adjust its bandwidth allocation values automatically. When bandwidth allocation application 508 is in the auto adjust mode, it may, for example, detect under-utilization of the bandwidth allocated to a particular service and adjust the bandwidth allocation values.

Figure 7:
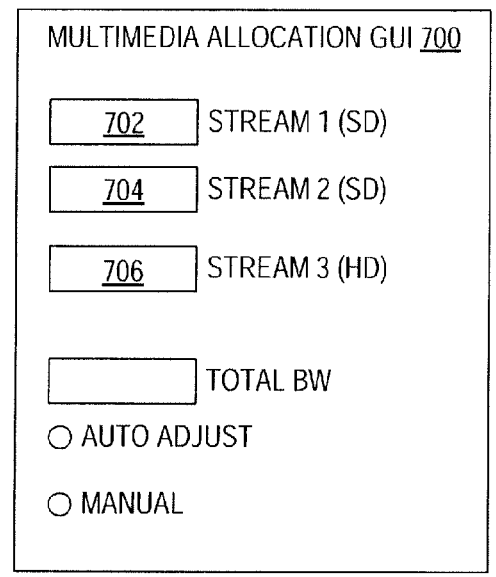
FIG. 7 is a representation of selected elements of an exemplary multimedia bandwidth allocation interface.

Bandwidth allocation GUI 600 as shown further includes a link 610 that is adjacent to the multimedia bandwidth allocation entry box and is labeled "Details." In some embodiments, clicking on link 610 may result in a multimedia allocation GUI 700 being displayed. Multimedia allocation GUI 700 as shown in FIG. 7 includes entry boxes 702, 704, and 706. The value stored in these entry boxes is user specified bandwidth allocations for different streams of content so that, for example, a user may allocate more bandwidth to a first stream than to a second stream. The stream-specific bandwidth allocations in FIG. 7 may be subject to minimum bandwidth constraints consistent with the minimum bandwidth required to display a particular type of stream, e.g., standard definition or high definition.

Figure 8A:
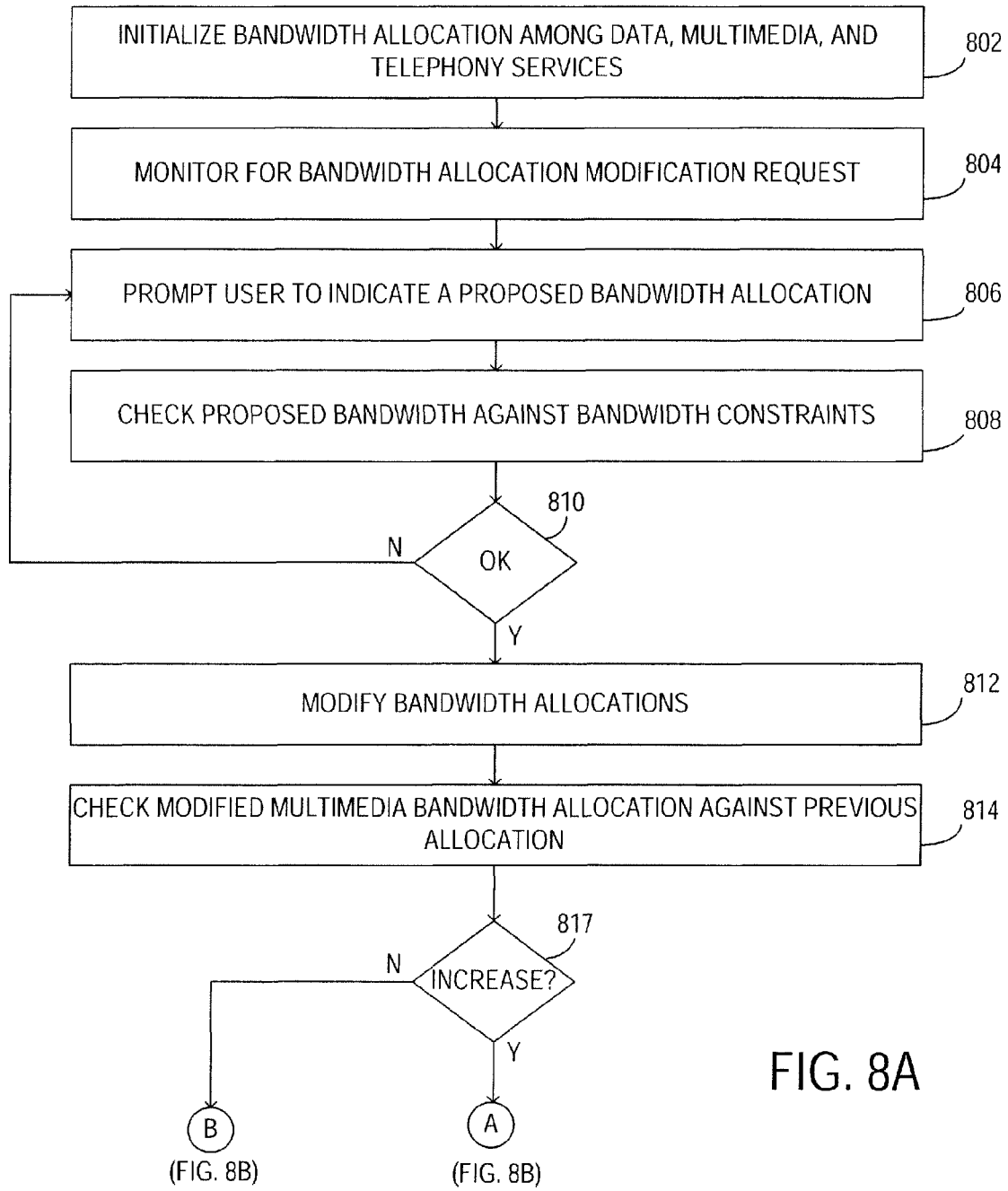
FIG. 8A and FIG. 8B are flow diagrams of selected elements of a bandwidth allocation method.
Figure 8B:
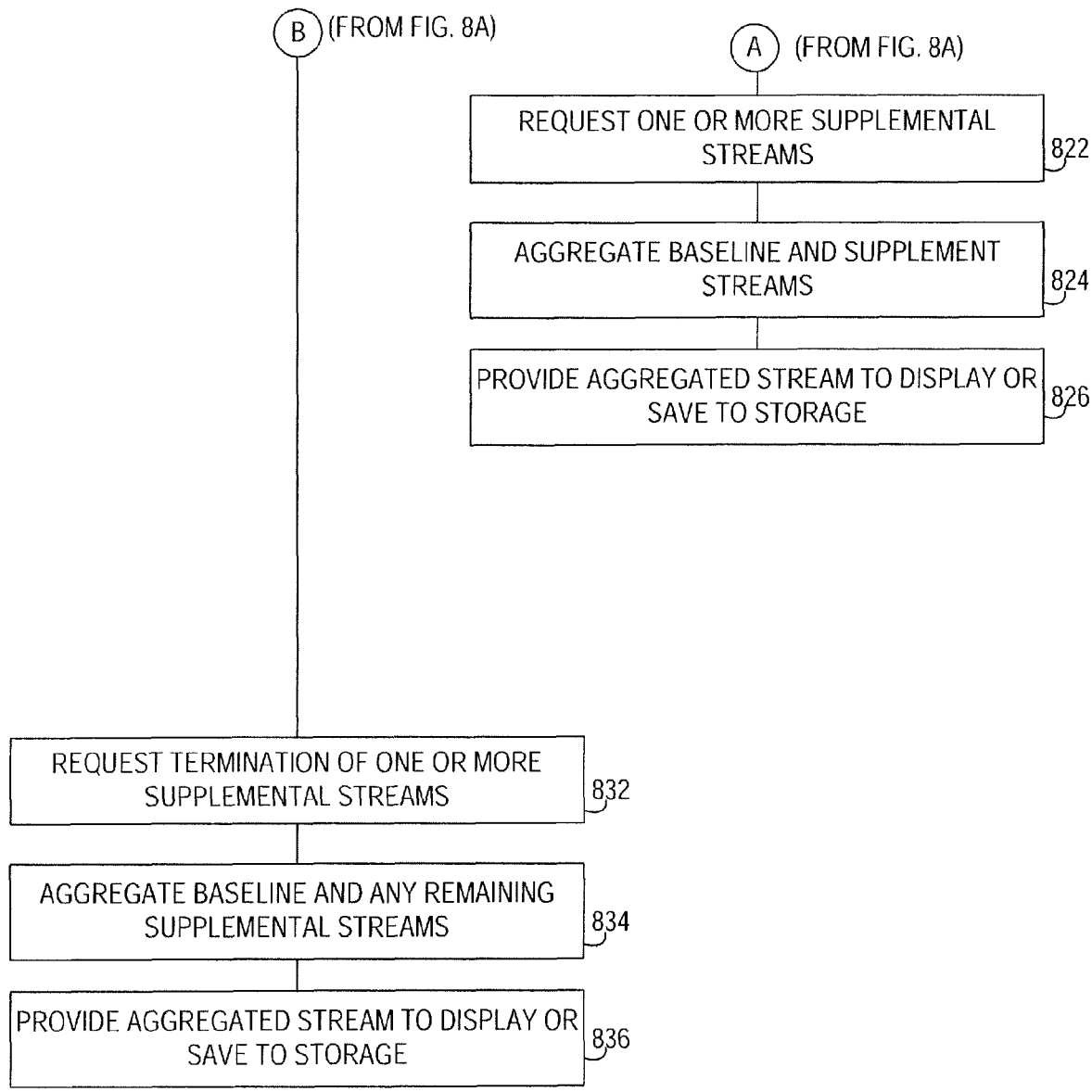

Turning now to FIG. 8A and FIG. 8B, selected elements of an embodiment of a method 800 for implementing user specified bandwidth allocation in a multimedia, multi-service environment are depicted. In the depicted embodiment, method 800 includes initializing (block 802) a bandwidth allocation among various services including data services, multimedia services, and telephony services. The method then monitors (block 804) for a bandwidth allocation modification request. When a modification request is received, method 800 includes prompting (block 806) the user to indicate a proposed bandwidth allocation. The depicted embodiment of method 800 checks (block 808) the proposed bandwidth allocation against any bandwidth constraints imposed by the service provider or another party, e.g., an equipment manufacturer. If the proposed bandwidth allocation is rejected in decision block 810, the control flow is returned to block 806.

If the proposed bandwidth allocation is acceptable, the bandwidth allocations are modified (block 812). The modification may alter any or all of the component bandwidth allocations including the multimedia bandwidth allocation, the data bandwidth allocation, and the telephony bandwidth allocation. After modifying a bandwidth allocation, the new or modified multimedia bandwidth allocation is checked (block 814) to determine if the multimedia bandwidth has increased or decreased.

If, in block 817, method 800 determines that multimedia bandwidth allocation has increased, control flow is routed to block 822 (FIG. 8B) where one or more additional supplemental streams are requested. The baseline stream and all supplemental streams are then aggregated (block 824) and provided (block 826) to a display screen or saved to storage.

If, in block 817, method 800 determines that multimedia bandwidth allocation has decreased, control flow braches to block 832 (FIG. 8B) where method 800 requests (block 832) the termination of one or more supplemental streams. The number of streams requested for deletion is an implementation specific function of how much bandwidth is allocated to each supplemental stream and how much the multimedia bandwidth allocation decreased. After the requested number of supplemental streams have been terminated, method 800 includes aggregating (block 834) a baseline stream and any remaining supplemental streams and providing (block 836) the aggregated stream to a display device and or to storage.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A non-transitory computer readable medium, comprising program instructions, executable by a processor, for supporting flexible bandwidth allocation, the program instructions comprising instructions to:

respond to receiving a subscriber indication specifying bandwidth allocation information including information selected from a data allocation indicative of a bandwidth allocated to a data service, a telephony allocation indicative of a bandwidth allocated to a telephony service, and a multimedia allocation indicative of bandwidth allocated to a multimedia service by:

approving a bandwidth allocation constraint in the bandwidth allocation information against a maximum cumulative bandwidth constraint, a minimum telephony bandwidth constraint, a minimum data bandwidth constraint, and a minimum multimedia bandwidth constraint; and modifying a multimedia bandwidth allocation value indicative of bandwidth allocated to a multimedia content delivery service; and respond to receiving a subscriber request for content by:

generating a set top box request for content indicating a multimedia content program and including allocation-influenced information determined, at least in part, by the multimedia bandwidth allocation value; and sending the set top box request for content to a multimedia service provider.

2. The computer readable medium of claim 1, wherein the allocation-influenced information includes information indicative of the multimedia bandwidth allocation value.

3. The computer readable medium of claim 1, wherein the allocation-influenced information includes information indicative of the multimedia bandwidth allocation value less any bandwidth consumed by other another multimedia content layer.

4. The computer readable medium of claim 1, wherein the allocation-influenced information is indicative of a number of multimedia reduced bandwidth layers associated with the multimedia content program.

5. The computer readable medium of claim 4, further comprising instructions to determine the allocation-influenced information based at least in part on the multimedia bandwidth allocation value.

6. The computer readable medium of claim 1, further comprising instructions to respond to detecting an underutilization signal by modifying a secondary bandwidth allocation value.

7. The computer readable medium of claim 6, further comprising instructions to invoke a bandwidth throttle for a throttled service selected from the data service, the telephony service, and the multimedia service.

8. The computer readable medium of claim 1, further comprising instructions to respond to receiving from the multimedia service provider a plurality of multimedia content layers associated with the multimedia content program by locally processing the plurality of multimedia content layers to generate a local rendition of the multimedia content program, wherein the local rendition is influenced by the multimedia content layers, and further wherein the local rendition is suitable for delivery to a display.

9. The computer readable medium of claim 8, wherein the plurality of multimedia content layers include temporally layered, spatially layered, and signal-to-noise layered multimedia content layers and wherein the local processing includes combining the temporally layered, spatially layered, and signal-to-noise layered multimedia content layers.

10. A system configured to deliver multimedia content layers to a subscriber, the system including a multimedia server being operable to:

process an original stream of a multimedia content program into a plurality of reduced bandwidth layers; and respond to receiving a set top box request for content specifying the multimedia content program and including allocation-influenced information by:

approving a bandwidth allocation constraint in the allocation-influenced information against a maximum cumulative bandwidth constraint, a minimum telephony bandwidth constraint, a minimum data bandwidth constraint, and a minimum multimedia bandwidth constraint;

identifying selected reduced bandwidth layers from the plurality of reduced bandwidth layers based at least in part on the allocation-influenced information; and transmitting the selected reduced bandwidth layers to the set top box.

11. The system of claim 10, wherein the multimedia server is operable to process the original stream into temporally layered reduced bandwidth layers, spatially layered reduced bandwidth layers, and signal-to-noise layered reduced bandwidth layers.

12. The system of claim 11, wherein the reduced bandwidth layers include temporally layered reduced bandwidth layers and wherein a frame rate of the original stream is 60 per second and wherein a frame rate of the reduced bandwidth layers is not greater than 30 per second.

13. The system of claim 12, wherein the frame rate of the reduced bandwidth layers is not greater than 15 per second.

14. The system of claim 12, wherein each reduced bandwidth layer represents a different subset of frames in the original stream.

15. The system of claim 10, wherein the allocation-influenced information includes a multimedia bandwidth allocation value.

16. The system of claim 15, wherein the identifying includes selecting a maximum number of the reduced bandwidth layers compatible with the multimedia bandwidth allocation value.

17. The system of claim 10, wherein the allocation-influenced information explicitly indicates the selected reduced bandwidth layers.

18. The system of claim 10, wherein the allocation-influenced information comprises original spatial, temporal, chromatic, and luminance information and wherein the reduced bandwidth layers include a subset of at least one of the spatial, temporal, chromatic, and luminance information.

19. A process for enabling a subscriber to allocate available bandwidth to different services, the process comprising:

enabling a set top box to respond to receiving a bandwidth allocation indication specifying a bandwidth allocation constraint, a multimedia bandwidth allocation value, and a secondary bandwidth allocation value selected from a data bandwidth allocation value and a telephony bandwidth allocation value by approving the bandwidth allocation constraint against a maximum cumulative bandwidth constraint, a minimum telephony bandwidth constraint, a minimum data bandwidth constraint, and a minimum multimedia bandwidth constraint;

enabling the set top box to process a subscriber request for content identifying a multimedia content program;

enabling the set top box to receive a plurality of reduced bandwidth layers corresponding to the multimedia content program; and enabling the set top box to combine the plurality of reduced bandwidth layers into a locally rendered layer suitable for delivery to a display device, wherein a bandwidth characteristic of the locally rendered layer is influenced at least in part by the multimedia bandwidth allocation value.

20. The process of claim 19, wherein the plurality of reduced bandwidth layers includes spatially layered reduced bandwidth layers.

21. The process of claim 19, wherein the plurality of reduced bandwidth layers includes temporally layered reduced bandwidth layers.

22. The process of claim 19, wherein the plurality of reduced bandwidth layers includes signal-to-noise layered reduced bandwidth layers.

23. The process of claim 19, further comprising enabling the set top box to process a bandwidth allocation indication specifying a multimedia program bandwidth allocation indicative of bandwidth allocated to the multimedia content program.

24. A process for enabling a subscriber to allocate available bandwidth among a plurality of services, the process comprising:

enabling the subscriber to indicate a multimedia bandwidth allocation wherein the multimedia bandwidth allocation includes a bandwidth allocation constraint and affects a secondary allocation selected from a telephony bandwidth allocation and a data bandwidth allocation;

enabling the subscriber to request an item of multimedia content wherein a video quality of the item of multimedia content depends at least in part on the indicated multimedia bandwidth allocation; and responsive to detecting the multimedia bandwidth allocation, approving the bandwidth allocation constraint against a maximum cumulative bandwidth constraint, a minimum telephony bandwidth constraint, a minimum data bandwidth constraint, and a minimum multimedia bandwidth constraint.

* * * * *